Oct. 17, 1944.   B. D. ELMQUIST   2,360,767
CYCLE PUMP HOLDER
Filed March 13, 1943   2 Sheets-Sheet 1
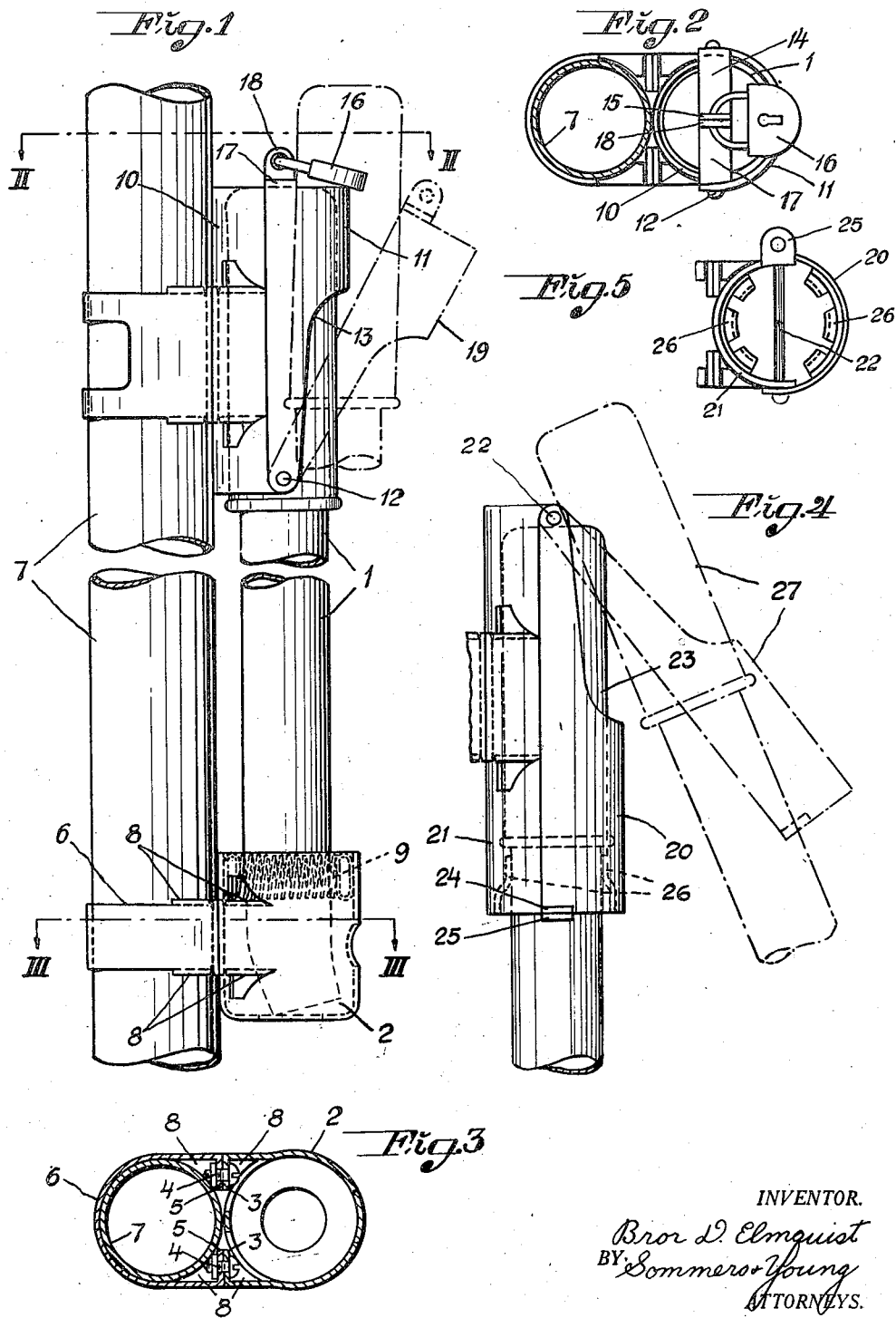
INVENTOR.
Bror D. Elmquist
BY Sommers & Young
ATTORNEYS.

Oct. 17, 1944.   B. D. ELMQUIST   2,360,767
CYCLE PUMP HOLDER
Filed March 13, 1943   2 Sheets-Sheet 2
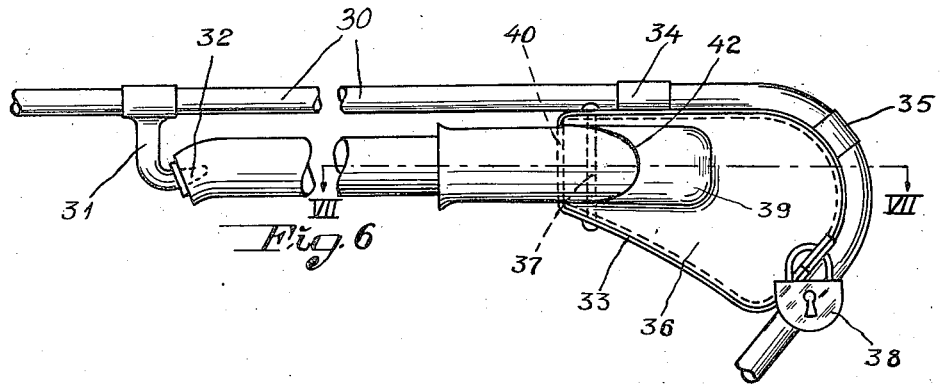
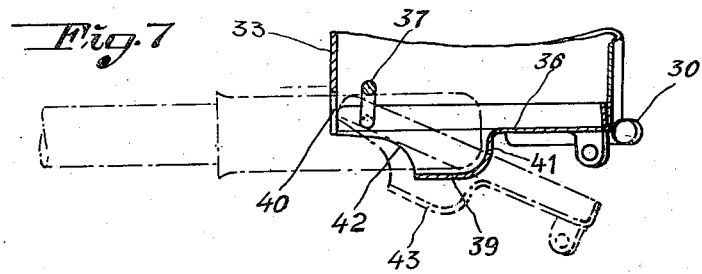
INVENTOR.
Bror D. Elmquist
BY Sommers + Young
ATTORNEYS.

Patented Oct. 17, 1944

2,360,767

UNITED STATES PATENT OFFICE 2,360,767

CYCLE PUMP HOLDER

Bror Daniel Elmquist, Stockholm, Sweden

Application March 13, 1943, Serial No. 479,154
In Sweden April 19, 1940

2 Claims. (Cl. 224—37)

My present invention relates to cycle pump holders, the chief object of the invention being the provision of a cycle pump holder of such a construction that removal of the pump by an unauthorized person is rendered impossible. According to my invention this is attained primarily by the provision of locking means. Furthermore, the bolts or rivets whereby the holder is secured to the bicycle may be arranged in such a manner that they are inaccessible when the pump is in locked position.

Further objects of the invention will be apparent according as the following description proceeds, reference being had to the accompanying drawings illustrating some preferred embodiments of the invention.

In the drawings:

Fig. 1 is a side elevation of an embodiment of a cycle pump holder according to my invention.

Fig. 2 is a sectional view of said holder along the line II—II in Fig. 1.

Fig. 3 is a sectional view of the same holder along the line III—III in Fig. 1.

Fig. 4 shows a side elevation of a second embodiment according to the invention.

Fig. 5 is an end view of the holder shown in Fig. 4 with the pump removed.

Fig. 6 shows a side elevation of a modification of the embodiment according to Fig. 1.

Fig. 7 is a cross sectional view along the line VII—VII in Fig. 6.

According to the embodiment shown in Figs. 1, 2 and 3 the cycle pump holder comprises two fastening members for supporting the ends of the pump 1, the fastening member for supporting the valve end of the pump consisting of a cylinder or box 2 partly closed at one end and provided with two longitudinal flanges 3 bent perpendicularly inwardly and attached by means of bolts 4 to corresponding flanges 5 extending inwardly from a clip 6 embracing the bar 7 of the bicycle frame. The clip 6 is prevented from being moved along the frame member 7 by tightening the bolts 4, said bolts being rendered inaccessible from outside by means of guards or flaps 8 projecting substantially perpendicularly at either end of the flanges 3 and 5 and thereby covering the openings at the ends of said flanges. The flanges 3 and 5 and the flaps 8 shown in the drawings are stamped out of the sheet metal of the fastening members and clips but it is evident that said flanges and flaps may instead be welded to the fastening members and clips. The inside of the box 2 is provided with resilient means in the form of a flattened coil spring ring 9 in order to prevent the end of the pump from rattling. It is evident that other resilient means may be used for this purpose, for instance a rubber ring or rubber blocks.

The second fastening member of the holder intended to receive the handle of the pump consists of a sleeve split longitudinally into two semi-cylindrical portions 10 and 11, portion 10 being attached to the frame member 7 in the same manner as the box 2. At the end opposite to the end of the pump handle the portion 11 is pivotally connected with the fixed portion 10 by means of pins 12 in such a manner that when said portion 11 is swung towards the fixed portion 10 a cylindrical sleeve will be formed for supporting the pump handle, the longitudinal edges of the portion 11 in the said position slightly overlapping the edges of the fixed portion 10. The swingable portion 11 is provided with a slit 13 beginning at the pivoted end of said portion and extending longitudinally some distance towards the opposite end of said portion, the width of said slit being such as to permit the pump handle to be swung into the slit when the swingable portion 11 is swung away from the fixed portion 10.

The end opposite to the pivot pins 12 of the swingable portion 11 is provided with a strip 14 projecting radially inwardly from the edge thereof and having its end bent perpendicularly so as to form a lug 15 provided with a hole for a padlock 16. A similar strip 17 with a perpendicularly bent lug 18 provided with a hole projects radially inwardly from the edge of the fixed portion 10, said strips and lugs being so located that the hole in the lug 15 registers with the hole in the lug 18 when the swingable portion 11 is swung towards the fixed portion 10. In this position the two portions can be locked to each other by inserting the link of the padlock 16 through the holes in the lugs 15 and 18. In the said locked position the strips 14 and 17 form an abutment, preventing the pump from being lifted out of the holder.

The pump is removed from the holder in the following way. The padlock 16 having been unlocked and removed, the swingable portion 11 is swung away from the fixed portion 10 through a small angle to a position indicated by dotted lines at 19 in Fig. 1, whereupon the pump handle is swung into the slit 13 in the swingable portion 11 and lifted out of the box 2. Then it may be easily removed from the holder.

In the second embodiment shown in Fig. 4, which illustrates only the fastening member for the pump handle, a swingable portion 20 is pivotally connected with a fixed portion 21 at the pump handle end of said portion, a pivot pin 22 being arranged across the opening of the sleeve formed by said portions so as to form an abutment for preventing the pump from being moved longitudinally. In this embodiment the slit 23 into which the pump handle may be swung is beginning at the pump handle end of the swingable portion 20. Lugs 24 and 25 for locking the portions 20 and 21 to each other are located at the end of said portions opposite to the pivot pin 22, said lugs projecting radially outwardly from the edges of said portions. Projecting radially inwardly from the inside of said edges are resilient catches or abutments 26, adapted to prevent the pump handle from slipping out of the fastening member in case of rupture of the fastening member at the valve end of the pump. The resilient abutments 26, which also serve the purpose of preventing the handle from rattling, may be made of other suitable resilient material, for instance of rubber. The removal of the pump from the holder according to the embodiment illustrated in Figs. 4 and 5 is effected substantially in the same manner as described above with reference to the first embodiment, the position of the pump handle and the swingable member 20 when the removal is effected being indicated by dotted lines at 27 in Fig. 4.

A modification of the embodiment shown in Figs. 1, 2 and 3 is illustrated in Figs. 6 and 7. The cycle pump holder shown in the last-mentioned figures is secured to the horizontal frame rod 30 of a cycle parcel carrier of conventional design. The fastening member for supporting the valve end consists of a pin 31 extending downwardly from said rod 30 and having its tapered end 32 bent at right angles so as to engage the valve hole at the end of the pump, thereby also forming an abutment preventing longitudinal motion of the pump in the direction away from the fastening member supporting the pump handle. Said last-mentioned fastening member comprises a fixed portion in the form of a sheet metal tool box 33, secured to the rod 30 by means of clips 34 and 35. A swingable portion in the form of a lid 36 is pivotally connected with the tool box 33 by means of a pin 37, said lid 36 being lockable to the tool box 33 by means of a padlock 38. The lid 36 is provided at its pivoted end with a semicylindrical bulge 39 extending longitudinally outwardly and adapted to receive the outer half of the pump handle end, the inner half of said handle engaging a semicircular slit 40 cut into the end wall of the tool box 33. When the lid 36 is in locked position the pump handle is prevented from being moved farther into the tool box 33 by the end wall 41 of the bulge 39, said bulge being provided with a longitudinal slit 42 beginning at the pivoted end of the lid 36 and having such a width as to permit the pump handle to be swung thereinto when the lid is opened through a small angle as shown by dotted lines at 43 in Fig. 7. When the lid 36 is in said position the valve end of the pump can be moved out of engagement with the pin 32, whereupon the end of the pump handle can be withdrawn from the tool box 33.

Having thus described my invention what I claim and desire to protect by Letters Patent is:

1. A cycle pump holder comprising two fastening members adapted to be attached to a bar of the cycle frame and in attached position to support the ends of the cycle pump, each fastening member being provided with abutment means for engaging the end of the pump supported thereby so as to prevent the pump from being moved longitudinally in the direction away from the other fastening member, clips embracing a bar of the cycle frame adjacent the fastening members, said clips having side plates, said plates having flanges at their longitudinal edges extending toward each other, said fastening members having longitudinal flanges along their free longitudinal edges extending toward each other, attachment means for attaching the fastening means flanges to the corresponding clip flanges, guards at the ends of said flanges extending perpendicularly thereto and transversely to the side plates so as to close the ends of said clips and fastening members at the ends of the longitudinal flanges, thereby rendering said fastening means inaccessible when the pump is in the holder, one of said fastening members comprising a socket to receive and support one end of said pump and the other comprising a fixed portion and a portion swingably connected at one end to said fixed portion, the two portions forming an enclosure for the other end of said pump, said swingable portion being provided with a slit extending longitudinally from the swingably connected end thereof, said slit having sufficient width to permit the pump to be swung into it when the swingable portion is swung away from the fixed portion, thereby permitting the pump to be removed from the holder, and means to lock the swingable portion to the fixed portion.

2. A cycle pump holder for pumps having handle means at one end and discharge means at the other end, said holder comprising two fastening members to be attached to a portion of the frame of the cycle and in attached position to support the ends of the cycle pump, each fastening member being provided with abutment means for engaging the end of the pump supported thereby so as to prevent the pump from being moved longitudinally in the direction away from the other fastening member, the fastening member supporting the handle end of the pump being provided at the end opposite to said abutment means with resilient catches extending radially inwardly from the inside of said fastening member in order to prevent the pump handle from slipping out of the fastening member in case of rupture of the other fastening member, one of said fastening members comprising a socket to receive and support one end of said pump and the other comprising a fixed portion and a portion swingably connected at one end to said fixed portion, the two portions forming an enclosure for the other end of said pump, said swingable portion being provided with a slit extending longitudinally from the swingably connected end thereof, said slit having sufficient width as to permit the pump to be swung into it when the swingable portion is swung away from the fixed portion, thereby permitting the pump to be removed from the holder, and means to lock the swingable portion to the fixed portion.

BROR DANIEL ELMQUIST.